UNITED STATES PATENT OFFICE.

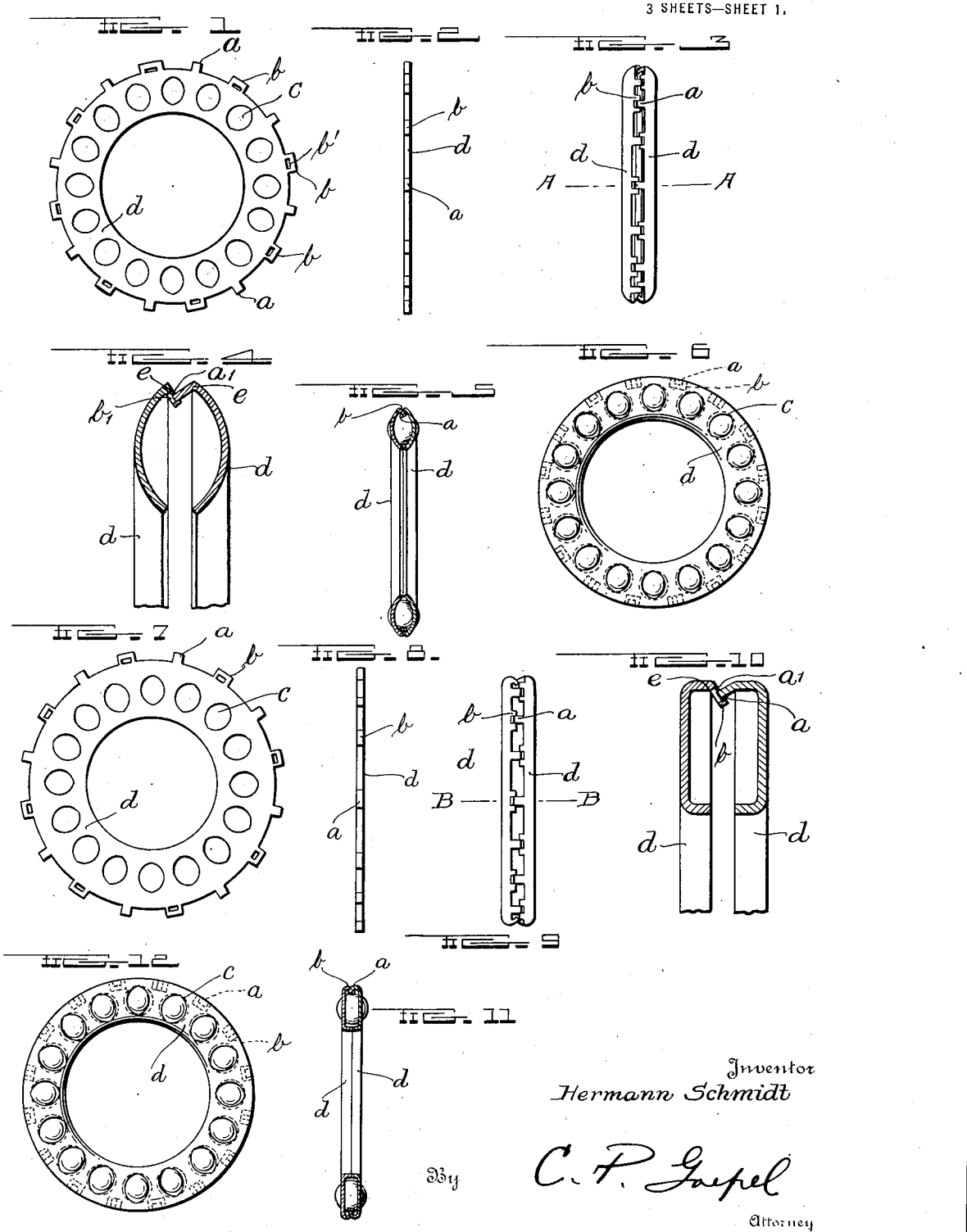

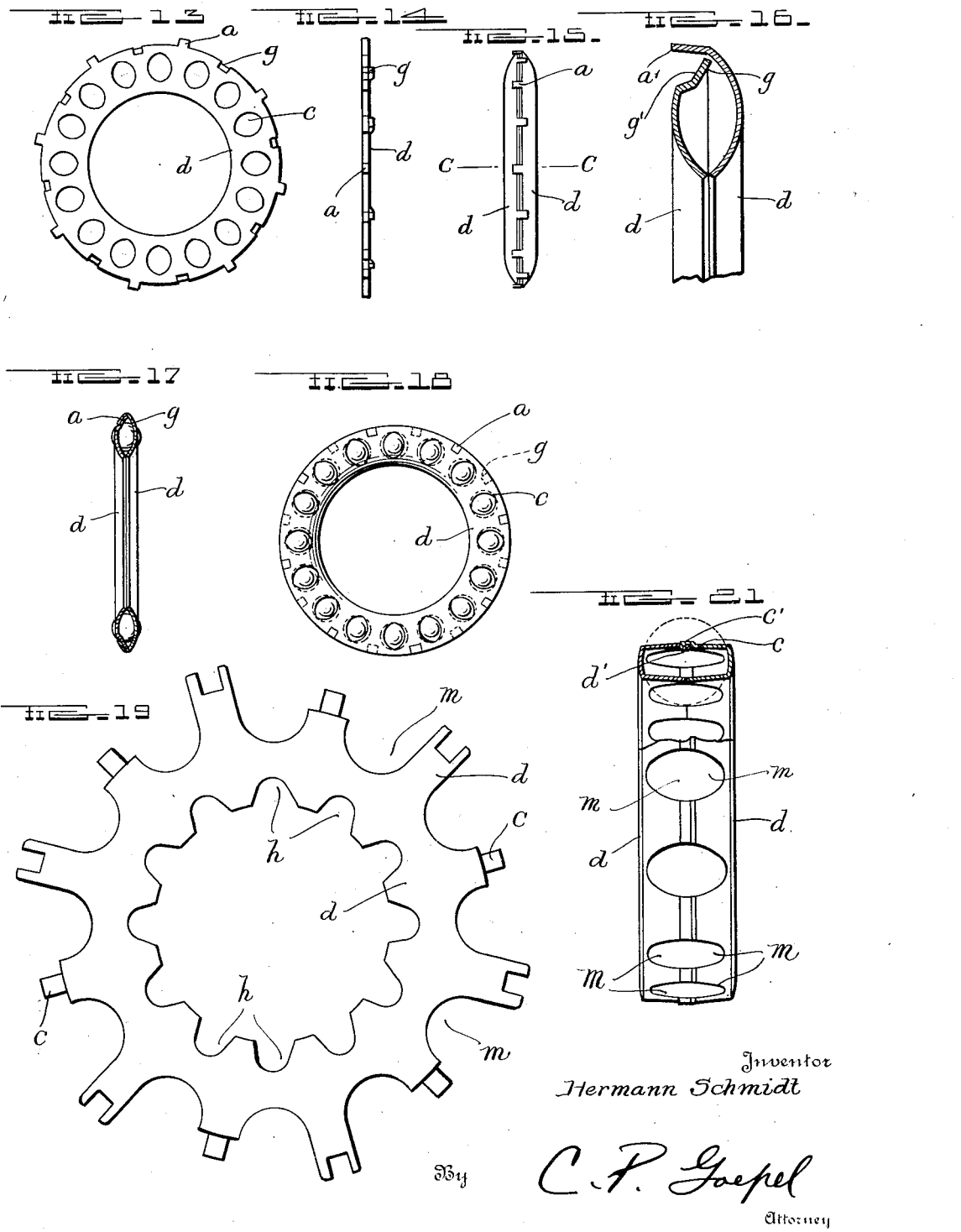

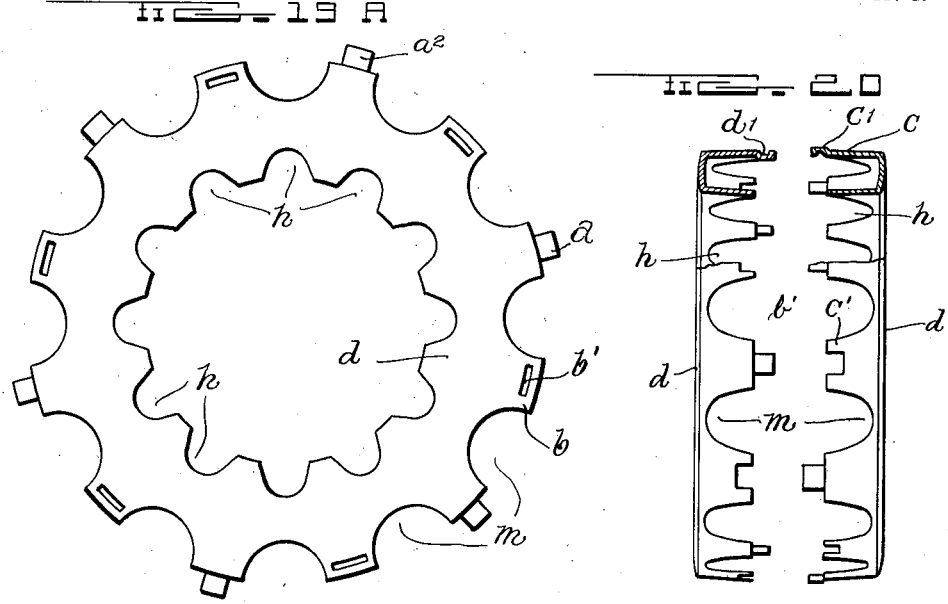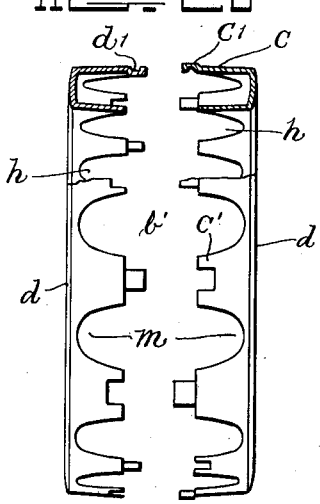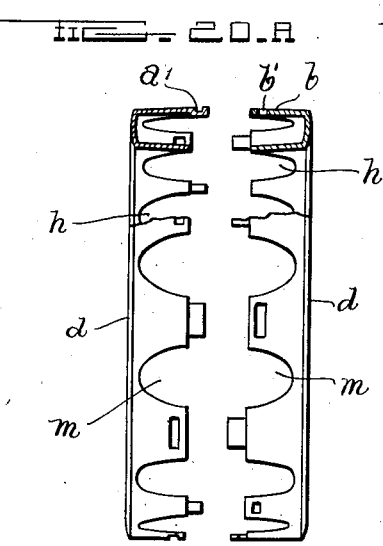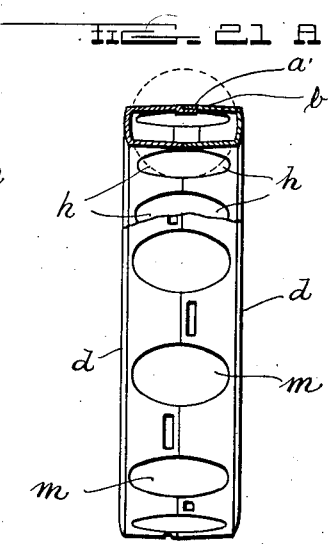

HERMANN SCHMIDT, OF STUTTGART-FEUERBACH, GERMANY, ASSIGNOR, BY MESNE ASSIGNMENTS, TO THE NORMA COMPANY OF AMERICA, OF NEW YORK, N. Y., A CORPORATION OF NEW YORK.

BALL-BEARING CAGE.

1,411,303.    Specification of Letters Patent.    Patented Apr. 4, 1922.

Application filed November 21, 1917. Serial No. 203,246.

*To all whom it may concern:*

Be it known that I, HERMANN SCHMIDT, of 46 Bachstrasse, Stuttgart-Feuerbach, in the Kingdom of Wurttemberg, German Empire, foreman, have invented certain new and useful Improvements in Ball-Bearing Cages, (for which I have filed applications in Germany October 26, 1916, and January 8, 1917,) of which the following is a specification.

My invention relates to cages for ball bearings and more especially to ball cages composed of two halves of identical shape. Its particular object is a ball cage of simple construction and high efficiency, the two parts presenting suitable projections and indentures allowing the halves to be joined together in such a manner as to prevent them from turning relatively to each other and from separating accidentally.

In the drawings affixed to this specification and forming part thereof various forms of ball cages embodying my invention are shown.

Figs. 1 to 6 show one form of cage,

Figs. 1 and 2 are a plan and an elevation, respectively, of a flat blank, while

Fig. 3 is an elevation of two such blanks pressed to shape and in position ready for joining.

Fig. 4 is a cross section, taken on the line A—A (Fig. 3) and drawn to a larger scale, of a detail showing the means for joining the two halves.

Figs. 5 and 6 are a cross section and plan, respectively, of the finished ball cage with the balls inserted.

Figs. 7 to 12 and 13 to 18, respectively, illustrate in a like manner, two other forms.

Figs. 19 to 21 and 19$^a$ to 21$^a$, respectively, show two more forms,

Figs. 19 and 19$^a$ being plans of the flat blanks,

Figs. 20, 20$^a$ and 21, 21$^a$ showing the blanks, pressed to shape, before and after joining.

Referring to the drawings, the ring-shaped sheet metal blank $d$ (Fig. 1) has the usual number of slots $c$. On its circumference there are evenly distributed narrow teeth $a$ and broad teeth $b$, the narrow and broad teeth alternating with each other. Each tooth $b$ is provided with a slot $b_1$ adapted to receive a narrow tooth $a$. In order to join two such rings together, the rings are first pressed to shape and the teeth $a$ and $b$ bent substantially as shown in Fig. 4, the upper edge $a^1$ of tooth $a$ being positioned somewhat below the bend $e$, while the broad tooth $b$ is bent to a more pointed angle, thus allowing the teeth $a$, when the rings are in position for joining, to enter the slots $b_1$. The two rings are then pressed against each other, until the teeth $a$ and $b$ are forced by the inner walls of the rings to bend to an almost vertical position, thus firmly and permanently securing the rings together.

The form shown in Figs. 7 to 12 differs from the one described above only in so far as the two blanks are pressed, before being joined together, into shapes of rectangular or U-section, the finished cage enclosing a substantially rectangular space.

In the form shown in Figs. 13 to 18 the broad teeth of the above mentioned forms are replaced by indentures $g$ formed in the circumference of each ring, the narrow teeth $a$ being designed, to enter, upon being bent, into these indentures and to lie flat against the outer wall of the other ring, which may be depressed in this place, as shown at $g_1$ (Fig. 16.)

In every case the balls are inserted between the rings before these latter are joined together.

The two forms shown in Figs. 19 to 21 and 19$^a$ to 21$^a$ differ from those described above in that complete ball slots are not formed in each ring, but half slots or recesses are formed in the inner and outer edges of each ring. Each ring thus presents a circular row of half-slots $h$ on its inner periphery and a like row of half-slots $m$ on its outer periphery.

After the projections $a_2$ of the form represented in the upper half of each figure have been doubled and the two rings have been pressed to shape, as shown in Fig. 20, they may be joined together by strong pressure, the curved edges of the doubled teeth allowing them to give way in a central direction so that the outer edges of the slots of the teeth $b_2$ are free to pass overhead, until the doubled teeth $a_2$ can enter the slots where they are held by elastic outward pressure, their sharp edges preventing their separating again.

In order to open such a cage, some of the teeth $a_2$ need merely be subjected to a centrally directed radial pressure, whereupon the two halves may easily be separated.

In the form shown in Figs. 19 to 21 the teeth are bent to hook-shape before being joined together. The teeth $c$ of one blank are formed into hooks as shown at $c_1$ (Fig. 20), while the teeth $d$ are formed into hooks having the inverse shape, as shown at $d_1$ (Fig. 20), each pair of hooks $c_1$ $d_1$ being brought to bear against each other so as to form a reliable and nevertheless easily disengaging joint between the two halves, the elasticity of the hooks thus formed greatly facilitating the joining together of the halves as well as subsequent separation, the pressing down of a few hooks sufficing for disengaging one half from the other. Indentures formed in the teeth $c$ prevent the halves from effecting any angular displacement relatively to each other, teeth $d$ entering into these indentures.

In the form shown in Figs. 19$^a$, 20$^a$ and 21$^a$ the teeth $a$ are bent to hook-shape as at $a_1$ (Fig. 20$^a$), while the teeth $b$ are provided with a transverse slot each, the elastic hooks $a_1$ entering the slots $b_1$ upon pressure being exerted upon the halves in an axial direction.

In the two forms last described above the inner teeth of the two halves merely abut against each other. However, if it is desired, in the case of cages of extraordinary size, to increase the strength of the joint between the two halves, the inner teeth may be formed and joined in a manner similar to that of the outer teeth.

I claim:—

1. A cage for ball bearings comprising two similarly-formed members having portions that project toward each other, said projecting portions provided with grooves arranged in spaced circumferential relation and alternately placed on the projecting portions of the two members, said projecting portions also having tongues circumferentially spaced apart and alternately arranged on the projecting portions opposite to said grooves and adapted to enter the grooves when the members are brought together.

2. A cage for ball bearings comprising two similarly-formed members having portions that project toward each other, said projecting portions provided with grooves arranged in spaced circumferential relation and alternately placed on the projecting portions of the two members, said grooves having circumferentially spaced apart end walls, said projecting portions also having tongues circumferentially spaced apart and alternately arranged on the projecting portions opposite said grooves and adapted to enter the grooves when the members are brought together, said tongues being adapted to engage between the end walls to maintain the members from relative rotation.

3. A cage for ball bearings comprising a pair of identically-constructed members composed of bodies having projecting portions, the ends of the projecting portions of the two bodies adapted to abut, the abutting projecting portions of the bodies having circumferentially spaced grooves and tongues alternately arranged with respect to the grooves, said tongues being adapted to seat in the grooves when the members are assembled to interlock the members against separation and relative turning.

In testimony whereof I affix my signature, in presence of two witnesses.

HERM. SCHMIDT.

Witnesses:
F. HAUG,
E. DSYLE.